United States Patent
Zwecker et al.

[11] Patent Number: 5,558,943
[45] Date of Patent: Sep. 24, 1996

[54] MOLDING OF BMC MOLDING MATERIALS HAVING IMPROVED SURFACE PROPERTIES

[75] Inventors: Joachim Zwecker, Weinheim; Dieter Buhl, Frankenthal; Anton Hesse, Weinheim, all of Germany

[73] Assignee: BASF Aktiengesellschaft, Ludwigshafen, Germany

[21] Appl. No.: 422,908

[22] Filed: Apr. 17, 1995

[30]  Foreign Application Priority Data

Apr. 29, 1994 [DE] Germany ............... 44 15 102.0

[51] Int. Cl.⁶ ..................... C08G 63/02
[52] U.S. Cl. ............. 428/458; 528/274; 525/64; 525/65; 525/108; 525/112; 525/166; 525/168; 526/109; 427/585
[58] Field of Search .................. 528/272, 274; 525/64, 65, 108, 112, 166, 168; 526/109; 428/458; 427/585

[56]  References Cited

U.S. PATENT DOCUMENTS 3,510,457  5/1970  Jannssen .
5,354,809  10/1994  Hesse et al. .................... 525/64

FOREIGN PATENT DOCUMENTS 0012536  6/1980  European Pat. Off. .
0083837  7/1983  European Pat. Off. .
0271970  6/1988  European Pat. Off. .
2445849  8/1980  France .
1544673  3/1972  Germany .
2362397  6/1975  Germany .
1519519  7/1978  United Kingdom .

*Primary Examiner*—James J. Seidleck
*Assistant Examiner*—Duc Truong
*Attorney, Agent, or Firm*—Oblon, Spivak, McClelland, Maier, & Neustadt, P.C.

[57]  ABSTRACT

Moldings having improved surface properties are produced using BMC molding materials which contain crystalline unsaturated polyesters.

7 Claims, No Drawings

MOLDING OF BMC MOLDING MATERIALS HAVING IMPROVED SURFACE PROPERTIES

The present invention relates to the use of a molding material based on unsaturated polyester resins for the production of moldings having improved surface properties.

Moldings produced from curable, pasty polyester resins bulk molding compound, or (BMC materials) have high heat distortion resistance, good mechanical properties, chemical resistance and, if they contain thermoplastic low-shrink components (LP additives), very low shrinkage. However, the surface properties of such moldings are unsatisfactory for many applications. For example, articles for the household and sanitary sector have insufficient scratch resistance. When the surface is damaged, liquids can penetrate, resulting in an unattractive appearance of the molding. In the case of electrical parts, for example switchboxes, and automotive parts, for example tailgates, which have been produced from BMC molding materials, the coatability is insufficient in many cases, with the result that the coat may flake off under severe stress.

Automotive headlamps contain parabolic reflectors which deliver a directed cone of light. These reflectors are predominantly produced from BMC materials by the injection molding process. The inner surface of the reflectors is coated by vapor deposition with an aluminum layer which is from about 1 to 5 µm thick and reflects the light. It has been found that the surface of the reflector has a certain roughness and unevenness. To ensure satisfactory adhesion of the aluminum layer and to obtain a perfectly flat and smooth reflective layer during vapor deposition, the inner surfaces of the headlamp reflectors are currently provided with a coating prior to the vapor deposition. Four expensive operations are required for this purpose: UV pretreatment of the surface, coating, drying in the air and curing. These relationships are summarized in the lecture BMC—Fertigung von Scheinwerferreflektoren by W. Haack at the International Conference on Glass Fiber-reinforced Plastics in Automotive Construction, October 1988, published in the Conference Handbook.

It is an object of the present invention to improve the surface properties of moldings of BMC molding materials.

We have found that this object is achieved if the molding material contains from 2 to 12% by weight of a styrene-insoluble, crystalline polyester.

Preferred BMC molding materials have the following composition:

A. from 8 to 20% by weight of an unsaturated polyester resin in the form of a solution in styrene, B. from 2 to 12% by weight of a styrene-insoluble, crystalline unsaturated polyester, C. from 0 to 12% by weight of a low-shrink polymer component, D. from 8 to 20% by weight of reinforcing fibers, E. from 40 to 70% by weight of fillers, F. from 0.1 to 1% by weight of polymerization initiators and G. if required, further additives, the percentages summing to 100.

Regarding the individual components of the molding material, the following may be stated:

A. Unsaturated polyester resins are 50–80% strength by weight solutions of amorphous unsaturated polyesters in from 20 to 50% by weight of monomers, preferably in styrene. Suitable unsaturated polyesters are the conventional condensates of polybasic, in particular dibasic, carboxylic acids and the esterifiable derivatives thereof, in particular the anhydrides thereof, which are linked by an ester bond to polyhydric, in particular dihydric, alcohols and may additionally contain radicals of monobasic carboxylic acids or monohydric alcohols, and at least some of the starting materials must have ethylenically unsaturated, copolymerizable groups.

Examples of suitable alcohol components are ethylene glycol, 1,2-propylene glycol, 1,3-propanediol, 1,3-butanediol, 1,4-butanediol, 1,6-hexanediol, 1,2,6-hexanetriol, neopentylglycol, diethylene glycol, triethylene glycol, dipropylene glycol, 1,2-cyclohexanediol, hydrogenated bisphenol A, cyclohexanedimethanol, ethoxylated bisphenol A and dihydroxymethyltricyclodecane, trimethylolpropane, glycerol and pentaerythritol.

Suitable carboxylic acids and derivatives thereof are dibasic olefinically unsaturated carboxylic acids, for example maleic acid, fumaric acid, chloromaleic acid, itaconic acid, citraconic acid, methyleneglutaric acid and mesaconic acid and esters thereof and preferably anhydrides thereof. Other modifying dibasic or unsaturated and/or saturated and aromatic carboxylic acids may be incorporated in the polyesters, for example succinic acid, glutaric acid, adipic acid, sebacic acid, o-phthalic acid, isophthalic acid, terephthalic acid, tetrahydrophthalic acid and endomethylenetetrahydrophthalic acid.

A preferred monomer is styrene. It may be partially replaced by other copolymerizable monomers, such as substituted styrenes, (meth)acrylates or vinyl esters.

The component A is contained in the molding materials in amounts of from 8 to 20, preferably from 12 to 18%, by weight.

B. Crystalline unsaturated polyesters are insoluble or at most soluble in very small amounts in styrene at room temperature. They are condensates of symmetric diols and symmetric dicarboxylic acids, it being possible for up to 40, preferably less than 20, mol % of the dicarboxylic acid components and up to 20 mol % of the diol component also to be asymmetric. Crystalline polyesters are known, for example, from DE-B 1 544 673, U.S. Pat. No. 3,510,457, GB-A 1 519 519 and EP-A 83 837. Their molecular weight is in general from 500 to 10,000.

A preferred symmetric dicarboxylic acid is fumaric acid, if desired as a mixture with terephthalic acid, sebacic acid and adipic acid.

Suitable symmetric diols are ethylene glycol, 1,3-propanediol, 1,4-butanediol, 1,6-hexanediol, 1,10-decanediol, neopentylglycol and cyclohexanedimethanol.

A preferred diol is 1,4-butanediol, if desired as a mixture with ethylene glycol.

The crystalline polyesters are contained in the novel molding materials in amounts of from 2 to 12, preferably from 3 to 7%, by weight.

C. The thermoplastic polymeric compound C reduces shrinkage during curing of the BMC and thus improves the surface quality of the molding. Examples of suitable thermoplastic polymers are polystyrene, toughened polystyrene, polymethyl methacrylate, polyethylene, polyvinyl acetate, ethylene/vinyl acetate copolymer and corresponding copolymers and graft copolymers. Saturated polyesters and thermoplastic polyurethanes are also suitable. Rubber-like block copolymers, in particular those obtained from butadiene and styrene, are also useful.

The thermoplastic polymers may also contain carboxyl groups. They are contained in the molding materials in amounts of from 0 to 12, preferably from 4 to 7%, by weight.

The addition of the low-shrink polymer component can be dispensed with in the production of articles for the household and sanitary sector but not in automotive and electrical parts or in headlamp reflectors.

D. Suitable reinforcing fibers are inorganic and organic fibers in the form of rovings or cut fibers, for example of glass, carbon and cellulose, and synthetic organic fibers, such as polyethylene, polycarboxylates, polycarbonates and polyamides. They are contained in the molding materials preferably in amounts of from 8 to 20, particularly preferably from 10 to 15%, by weight. Glass fibers are preferred.

E. Suitable fillers are, for example, conventional finely pulverulent or granular inorganic fillers, such as chalk, kaolin, quartz powder, dolomite, barite, hydrated alumina, talc, pigments, kieselguhr and the like. They are contained in the molding materials preferably in amounts of from 40 to 70, particularly preferably from 50 to 60%, by weight.

F. The polymerization initiators used are conventional organic peroxides which form free radicals at elevated temperatures. Examples of suitable initiators are dibenzoyl peroxide, tertbutyl peroctoate, tert-butyl perbenzoate, dicumyl peroxide, di-tert-butyl peroxide and perketals, such as trimethylcyclohexanone perketal, and percarbonates. CC-labile compounds and azo compounds are also suitable. The initiators are contained in the molding materials in amounts of from 0.1 to 1, preferably from 0.4 to 0.7%, by weight.

G. Suitable further conventional additives are:
- lubricants, such as zinc stearate, magnesium stearate and calcium stearate as well as polyalkylene ether waxes, preferably in amounts of from 0.1 to 2% by weight.
- Inhibitors, such as hydroquinone, substituted hydroquinones, pyrocatechol, tert-butylpyrocatechol, pyrocatechols substituted in the nucleus, quinones, such as benzoquinone and naphthoquinone, chloranil, nitrobenzenes, such as m-dinitrobenzene, thiodiphenylamine, N-nitroso compounds, such as N-nitrosodiphenylamine and salts of N-nitrosocyclohexylhydroxylamine, and mixtures thereof. Salts of divalent copper, for example copper naphthenate or octoate, and quaternary ammonium salts are also suitable as additional stabilizers. The inhibitors are contained in the molding materials preferably in amounts of from 0.005 to 0.1% by weight.
- Thickeners, such as oxides or hydroxides of lithium, of magnesium, of calcium, of aluminum or of titanium. Magnesium oxide is preferred. The thickeners are contained in the molding material preferably in amounts of from 0.1 to 0.5% by weight.

The molding materials are prepared by mixing the components, preferably in a conventional kneader or roll mill at room temperature. The crystalline unsaturated polyesters B are advantageously dispersed beforehand as a crystallite suspension in the unsaturated polyester resin A. The BMC molding materials are converted into moldings on conventional Duromer injection molding machines, the molding material being injected into a heated mold and cured there at from 150° to 200° C.

The moldings have a readily coatable, scratch-resistant surface. Surprisingly, it has been found that headlamp reflectors produced using BMC molding materials containing crystalline polyesters can be metalated with aluminum vapor without prior coating, a perfectly level and smooth reflective layer having excellent adhesion to the substrate being obtained.

EXAMPLES

In the examples which follow, parts and percentages are by weight.

1. Preparation of the unsaturated polyester resins
   a) Amorphous UP in styrene
      An unsaturated polyester was prepared from maleic anhydride and propylene glycol in a molar ratio of 1:1.05 by melt condensation at 200° C. under nitrogen and was dissolved in styrene to give a 65% strength solution. The unsaturated polyester had an acid number of 28. The solution in styrene was stabilized with 150 ppm of hydroquinone.
   b) A crystalline polyester having an acid number of 20 was prepared by melt condensation of fumaric acid, adipic acid and 1,4-butanediol in a molar ratio of 1:0.25:1.25. The unsaturated polyester had a softening point (according to Krämer, Sarnow and Nagel) of 112° C. The polyester was crushed.

2. Preparation of the crystallite suspension

In a stirred vessel equipped with an anchor stirrer, a thermometer and jacket heating, a mixture of 500 parts of UP resin 1a, 200 parts of styrene and 300 parts of crystalline polyester 1b was mixed with 200 ppm of 2,6-dimethylquinone as an inhibitor and then heated to 100° C. until the crystalline polyester went into solution with stirring (30 revolutions per minute). The mixture was then cooled to room temperature (25° C.) in the course of 8 hours at the same stirring speed, and a free-flowing suspension having a solids content of 64% and a viscosity of 6,100 mPa.s (23° C.) was obtained.

3. Preparation of the BMC molding materials

Formulation I 100 parts of crystallite suspension according to 2 (50 parts of UP resin, 30 parts of crystalline polyester and 20 parts of styrene)

4.5 parts of zinc stearate 1.5 parts of tert-butyl perbenzoate 150 parts of aluminum trihydrate 90 parts of 12 mm long cut glass fibers Formulation II 60 parts of crystallite suspension according to 2 (i.e. 30 parts of UP resin, 18 parts of crystalline polyester and 12 parts of styrene)

40 parts of polymethyl methacrylate solution (14 parts of PMMA and 26 parts of styrene)

4.5 parts of calcium stearate 1.5 parts of tert-butyl perbenzoate 320 parts of chalk (Millicarb)

55 parts of 3 to 4 mm long cut glass fibers.

For the preparation of the materials, the liquid components were mixed and were homogenized with about 50% of filler to give a paste. The remaining filler and glass fibers were admixed in a kneader.

4. Processing of the BMC materials

I. Production of a serving tray

The BMC material I was introduced in portions into a mold heated at 140°–150° C. and pressed for 100 seconds.

Scratch resistance was determined for a 15×20 mm test specimen using a linear tribometer, an abrasion of 0.06 mg being measured. In a comparative test without the addition of the crystalline polyester (i.e. 100 parts of UP resin instead of the crystallite suspension), an abrasion of 0.1 mg was measured.

II. Production of a headlamp reflector

The mold for the production of the headlamp reflector was heated to a mold surface temperature of 150°–160° C. The BMC material was injected into the mold in the course of from 1 to 5 seconds and cured there for from 40 to 80 seconds.

After removal from the mold, the reflector was cleaned and was subjected to a UV treatment. Aluminum was applied by vapor deposition under reduced pressure in a layer thickness of from 80 to 100 μm. A smooth surface was formed without a coating having to be applied prior to the treatment.

We claim:

1. A method for preparing an aluminum-coated molding, comprising the steps of:
   1) mixing to form a paste
      a) from 8 to 20% by weight of an unsaturated polyester resin in the form of a solution in styrene,
      b) from 2 to 12% by weight of a crystalline unsaturated polyester, said crystalline unsaturated polyester being insoluble in styrene at room temperature,
      c) 0 to 12% by weight of a low-shrink polymer component,
      d) from 8 to 20% by weight of reinforcing fibers,
      e) from 40 to 70% by weight of fillers, and
      f) from 0.1 to 1% by weight of polymerization initiators;
   2) molding and curing said paste to form a surface; and
   3) vapor depositing a layer of aluminum directly on said surface.

2. The method of claim 1, wherein the crystalline unsaturated polyester is a condensate of fumaric acid or terephthalic acid or mixtures thereof and 1,4-butanediol.

3. The method of claim 1, wherein the low-shrink polymer component is polymethyl methacrylate or a saturated polyester.

4. The method of claim 1, wherein the mixing step further comprises mixing additives selected from the group consisting of lubricants, inhibitors, and thickeners.

5. The method of claim 1, wherein the layer of aluminum is of thickness from 80 to 100 μm.

6. The method of claim 1, wherein the aluminum-coated molding is a headlamp reflector.

7. A headlamp reflector, produced by the method of claim 1.

* * * * *